United States Patent
Kikuzuki et al.

(10) Patent No.: US 8,891,374 B2
(45) Date of Patent: Nov. 18, 2014

(54) WIRELESS COMMUNICATION DEVICE AND WIRELESS COMMUNICATION DEVICE CONTROL METHOD

(75) Inventors: Tatsuya Kikuzuki, Kawasaki (JP); Masafumi Katoh, Yokohama (JP); Kaoru Yokoo, Yokosuka (JP)

(73) Assignee: Fujitsu Limited, Kawasaki (JP)

( * ) Notice: Subject to any disclaimer, the term of this patent is extended or adjusted under 35 U.S.C. 154(b) by 89 days.

(21) Appl. No.: 13/418,544

(22) Filed: Mar. 13, 2012

(65) Prior Publication Data
US 2012/0236719 A1 Sep. 20, 2012

(30) Foreign Application Priority Data
Mar. 18, 2011 (JP) ................................. 2011-061781

(51) Int. Cl.
*H04L 12/26* (2006.01)
*H04W 74/08* (2009.01)
*H04L 12/28* (2006.01)
*H04W 24/02* (2009.01)
*H04W 24/10* (2009.01)

(52) U.S. Cl.
CPC .......... *H04W 74/0816* (2013.01); *H04W 24/02* (2013.01); *Y02B 60/50* (2013.01); *H04W 24/10* (2013.01)
USPC .......................................... 370/235; 370/338

(58) Field of Classification Search
None
See application file for complete search history.

(56) References Cited

U.S. PATENT DOCUMENTS

| | | | | |
|---|---|---|---|---|
| 2003/0189948 A1* | 10/2003 | Sashihara | ...................... | 370/445 |
| 2007/0116033 A1* | 5/2007 | Reunamaki et al. | .......... | 370/445 |
| 2008/0144500 A1* | 6/2008 | Chen et al. | ..................... | 370/235 |

FOREIGN PATENT DOCUMENTS

| | | |
|---|---|---|
| JP | 2006-13841 | 1/2006 |
| JP | 2007-174292 | 7/2007 |
| JP | 2010-103815 | 5/2010 |

* cited by examiner

*Primary Examiner* — Un C Cho
*Assistant Examiner* — M Mostazir Rahman
(74) *Attorney, Agent, or Firm* — Katten Muchin Rosenman LLP

(57) ABSTRACT

A wireless communication device, including a radio transceiver data configured to transmit and to receive data packets to and from a base station, and a processor configured to compute a proportional hidden standby time being computed on the basis of at least two of from among a proportional exposed communication time, a proportional exposed collision time, and a proportional exposed standby time, to compute a predicted PER from the proportional hidden standby time computed; to compute a threshold value for the number of retransmission attempts on the basis of the predicted PER computed, and to cause the radio transceiver to repeat transmission of a data packet to the base station until the number of transmissions exceeds the threshold value computed in the case of failed transmission of a data packet to the base station by the radio transceiver.

11 Claims, 10 Drawing Sheets

WIRELESS COMMUNICATION DEVICE AND WIRELESS COMMUNICATION DEVICE CONTROL METHOD

CROSS-REFERENCE TO RELATED APPLICATIONS

This application is based upon and claims the benefit of priority of the prior Japanese Patent Application No. 2011-61781, filed on Mar. 18, 2011, the entire contents of which are incorporated herein by reference.

FIELD

The disclosed technology is related to a wireless communication device and a wireless communication device control method.

BACKGROUND

Recently, various wireless communication systems, such as mobile phone systems, systems using wireless LAN, and communication systems using ZigBee (registered trademark) technology, are proliferating. In such wireless communication systems, many devices are disposed, with each device communicating individually. For this reason, in such wireless communication systems, multiple devices may simultaneously transmit data packets in some cases. In such cases, there is a risk that data packets may collide and data may become unreadable.

Thus, in such wireless communication systems, CSMA/CA (Carrier Sense Multiple Access with Collision Avoidance) is implemented to decrease data packet collisions even in cases where multiple devices each transmit a data packet. With CSMA/CA, a device that wants to transmit a data packet senses communication conditions on a channel (this may be hereinafter referred to as "carrier sense"), and initiates data packet transmission if the channel is clear.

Herein, if a given device is taken to be a device A, a device whose transmitted signal does not directly reach the device A is designated a "hidden node" with respect to the device A. Specifically, a hidden node is a device whose signals do not reach because of a wall or other obstruction between it and the device A, or because of a long distance to the device A. In other words, a device may be unable to sense the communication conditions of a hidden node with respect to that device. In contrast, if a given device is taken to be a device A, a device whose transmitted signal directly reaches the device A, or in other words, a device other than a hidden node excepting the device A, is designated an "exposed node" with respect to the device A. In other words, a device may be able to sense the communication conditions of an exposed node with respect to that device.

In the related art, there has been proposed technology that sets a suitable value for the number of data packet retransmit attempts and technology that computes and evaluates communication quality in such wireless communication systems implementing CSMA/CA.

For example, there is technology of the related art that specifies a fixed number of retransmission attempts in advance for all devices in a wireless communication system implementing CSMA/CA. With this technology of the related art, a system designer predicts or measures an average packet error rate (PER) in advance, computes an optimal number of retransmission attempts from the PER, and sets that number of retransmission attempts for each node. Additionally, a report is issued to a base station if the number of retransmission attempts exceeds a set value. The base station may stand by for a fixed amount of time, or issue a report to a system administrator.

As another example, there is technology of the related art that evaluates communication quality using a receive signal strength indication (RSSI) and shortens the retransmit interval when the RSSI value lowers in a wireless communication system implementing CSMA/CA. Communication quality is considered to be poor when the RSSI value is low. In such cases, it may take time for a device to complete transmission of a data packet if the retransmit interval is long. Thus, in this technology of the related art, such situations are avoided by shortening the retransmit interval.

Such technology of the related art is disclosed in Japanese Laid-open Patent Publication No. 2007-174292, Japanese Laid-open Patent Publication No. 2010-103815, and Japanese Laid-open Patent Publication No. 2006-13841, for example.

SUMMARY

According to an aspect of the invention, a wireless communication device, including a radio transceiver data configured to transmit and to receive data packets to and from a base station, and also to receive data packets transmitted to the base station by other devices, and a processor configured to compute a proportional hidden standby time during which no hidden node, which is a wireless communication device whose transmitted signals do not reach the wireless communication device, is transmitting a data packet to the base station, the proportional hidden standby time being computed on the basis of at least two of from among a proportional exposed communication time during which only one exposed node, which is a wireless communication device whose transmitted signals reach the wireless communication device, is transmitting a data packet to the base station, a proportional exposed collision time during which at least two exposed nodes are transmitting data packets to the base station, and a proportional exposed standby time during which no exposed node is transmitting a data packet to the base station, to compute a predicted PER from the proportional hidden standby time computed; to compute a threshold value for the number of retransmission attempts on the basis of the predicted PER computed, and to cause the radio transceiver to repeat transmission of a data packet to the base station until the number of transmissions exceeds the threshold value computed in the case of failed transmission of a data packet to the base station by the radio transceiver.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

Figure 1:
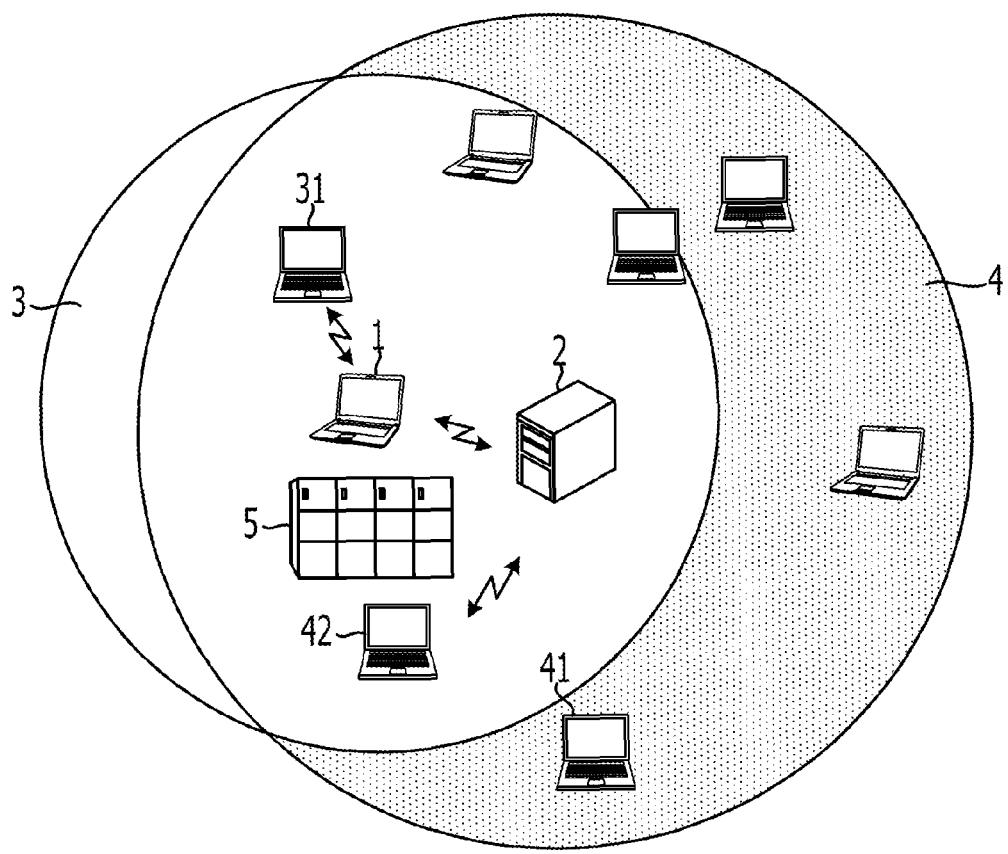
FIG. 1 is an overall diagram of a wireless communication system.

However, the technology of the related art that specifies a fixed number of retransmission attempts for all devices in a wireless communication system does not take into account PER differences among individual devices. Individual devices have different PERs depending on the number of hidden nodes and the distance to a base station. For this reason, when a fixed number of retransmission attempts is set for all devices, it may be difficult to set a suitable number of retransmission attempts for the PER not under unexpected influences such as external interference or communication equipment failure, or in other words, the PER due to packet collisions. Herein, the PER under no unexpected influences such as external interference or communication equipment failure is designated the "normal PER". For example, for a device with a normal PER that is higher than average, completing a transmission may involve more retransmissions than usual, even in cases where unexpected phenomena do not occur. However, in the case of setting a fixed number of retransmission attempts, a value may be set in a device which is insufficient as a number of retransmission attempts for completing a transmission in a state of normal PER. For this reason, there is a risk that a device may determine that there is unexpected influence even though there is none and stop retransmitting, even when retransmitting many times due to a high normal PER. Meanwhile, a device with a low normal PER may complete retransmission in a small number of retransmission attempts under ordinary circumstances. However, in the case of setting a fixed number of retransmission attempts, a value may be set in a device which is too high as a number of retransmission attempts for completing a transmission in a state of normal PER. For this reason, there is a risk that a device may retransmit a number of times greatly exceeding the number of retransmission attempts for completing data packet transmission for a state of normal PER, and be slow in discovering external sources of interference. Furthermore, since such devices repeat unnecessary retransmissions, there is a risk of wasteful power expenditure and increased interference on neighboring networks.

Also, it has been difficult to sufficiently evaluate communication quality with the technology of the related art that evaluates communication quality using RSSI information and shortens the retransmit interval. In other words, there may be many hidden nodes in some cases, even if the RSSI is large due to a strong signal from a base station. In such cases, although there is a risk that hidden nodes and data packets may collide and the PER may worsen, it is difficult to evaluate worsening of the PER due to hidden nodes with such technology of the related art.

The disclosed technology, being devised in light of the above, provides a wireless communication device and a wireless communication device control method able to communicate stably, decrease power expenditure, and additionally decrease interference on neighboring networks.

Hereinafter, embodiments of a wireless communication device and a wireless communication device control method disclosed herein will be described in detail and with reference to the drawings. However, the wireless communication device and the wireless communication device control method disclosed herein are not limited by the following embodiments.

Embodiment 1

FIG. 1 is an overall diagram of a wireless communication system. As illustrated in FIG. 1, a wireless communication system in accordance with the present embodiment includes a base station 2 and a plurality of devices such as a device 1. The device 1 is an example of a wireless communication device. In addition, the devices communicate with each other via the base station 2. Hereinafter, the device 1 will be described. The device 1 transmits a data packet to base station 2 in the case of transmitting a data packet to a device 31, for example. Then, the base station 2 transmits the data packet received from the device 1 to the device 31. Also, the device 1 receives a packet transmitted by the device 31 from the base station 2 in the case of receiving a data packet from the device 31. In this way, each device exchanges information with other devices via the base station 2 when transmitting and receiving data packets. Furthermore, the base station 2 may be unable to correctly receive transmitted data packets in the case where data packets transmitted from different devices are received at overlapping timings. This is because the data packets interfere with each other in what is referred as a data packet collision.

Meanwhile, the area 3 in FIG. 1 indicates the communicable range of the device 1 in a state of no radio wave obstructions (hereinafter referred to as the "communication area"). Also, the area 4 is the part of the communication area of the base station 2 that does not overlap with the communication area of the device 1. In other words, although a device existing in the area 4, such as the device 41, for example, is able to transmit and receive data packets to and from the base station 2, the device 1 may be unable to receive radio waves output from the device 41. Also, an obstruction 5 is disposed in the communication area of device 1. For this reason, if the obstruction 5 exists between the device 1 and another device, such as the device 42, for example, then radio waves output from that device may not be received by the device 1. However, since the device 42 exists inside the communication area of the base station 2, data packets can be transmitted and received to and from the base station 2. Devices like the devices 41 and 42, which are able to transmit and receive data packets to and from the base station 2 but whose output radio waves may not be received by the device 1, are referred to as "hidden nodes" with respect to the device 1. Also, a device such as the device 31, for example, which is able to transmit and receive data packets to and from the base station 2 and furthermore whose output radio waves may be received by the device 1, is hereinafter referred to as an "exposed node".

Additionally, as discussed later, the device 1 receives a data packet transmitted to the base station 2 by another device. By receiving the data packet, the device 1 senses whether or not another device is transmitted a data packet to the base station 2 (this may be hereinafter referred to as "carrier sense"). The device 1 then transmits a data packet to the base station 2 upon determining by carrier sense that a data packet is not being transmitted to the base station 2 by another device. In so doing, the device 1 decreases the data packet collision probability. However, the device 1 may be unable to receive output radio waves from hidden nodes such as the devices 41 and 42, for example. For this reason, the device 1 may be unable to detect by carrier sense that there is a data packet from a hidden node to the base station 2, even if a data packet is being transmitted to the base station 2 from a hidden node. Thus, the device 1 transmits a data packet to the base station 2 while a data packet is being transmitted to the base station 2 from a hidden node, and a data packet collision occurs. In the case where data transmission fails, the device 1 retransmits the data packet. Thus, details of the device 1, including such data packet retransmission, will be described next.

Figure 2:
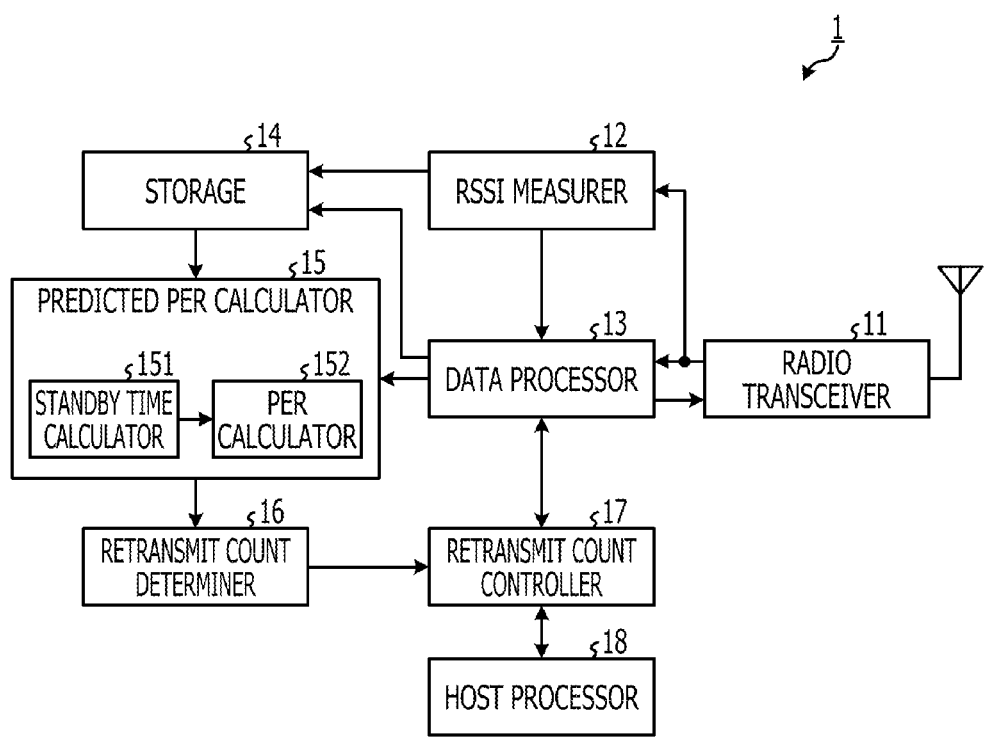
FIG. 2 is a block diagram of a device.

A device 1 in accordance with the present embodiment will be described with reference to FIG. 2. FIG. 2 is a block diagram of a device.

As illustrated in FIG. 2, a device 1 in accordance with the present embodiment includes a radio transceiver 11, an RSSI measurer 12, a data processor 13, storage 14, a predicted PER calculator 15, a retransmit count determiner 16, a retransmit count controller 17, and a host processor 18.

The radio transceiver 11 receives a data packet from the base station 2 via an antenna. Next, the radio transceiver 11 converts the received data packet into a baseband signal. Additionally, the radio transceiver 11 outputs the data packet converted into a baseband signal to the RSSI measurer 12 and the data processor 13.

Additionally, the radio transceiver 11 receives, via an antenna, a data packet output for the base station 2 from another device, such as the device 31 (see FIG. 1), for example. The radio transceiver 11 then converts the received data packet into a baseband signal. Additionally, the radio transceiver 11 outputs the data packet converted into a baseband signal to the RSSI measurer 12 and the data processor 13.

The radio transceiver 11 also accepts input of a data packet to be transmitted from the data processor 13. The radio transceiver 11 then converts the received data packet into a radio signal. The radio transceiver 11 transmits the data packet converted into a radio signal to the base station 2 via an antenna.

The data processor 13 receives a data packet converted into a baseband signal from the radio transceiver 11. Then, the data processor 13 references the header of the data packet and determines whether or not the received data packet was transmitted from the base station 2.

In the case where the received data packet was transmitted from the base station 2, the data processor 13 applies baseband processing such as demodulation and error correction to the data packet. The data processor 13 then provides the baseband-processed signal to the user by causing it to be displayed on a display (not illustrated), for example.

The data processor 13 additionally receives, from the base station 2 via an antenna and the radio transceiver 11, a proportional time Pt during which one of the devices able to communicate with the base station 2 was transmitting data to the base station 2 during a fixed period. The fixed period herein may be 10 seconds since the device 1 issued a data transmit request, for example. Specifically, the data processor 13 transmits a data transmit request to send before transmitting data to the base station 2. Then, the base station 2 computes Pt from data packets transmitted from respective devices during a 10 second period after the data transmit request is received. The base station 2 transmits the computed Pt value to the device 1. The data processor 13 additionally receives, from the base station 2 via an antenna and the radio transceiver 11, a proportional time Ps during which none of the devices able to communicate with the base station 2 was transmitting data to the base station 2 during a fixed period. Similarly to Pt, the base station 2 computes Ps and the data processor 13 receives the computed value. The data processor 13 outputs the received Pt and Ps to the predicted PER calculator 15.

At this point, the data processor 13 keeps receiving and outputting Pt and Ps to the predicted PER calculator 15 for a fixed time interval. In so doing, a threshold value for the number of retransmission attempts to be discussed later is updated, and a suitable number of retransmission attempts is set. In other words, a suitable number of retransmission attempts can be set adaptively if this fixed time interval is shortened. However, since data packet transmission is suspended while setting the number of retransmission attempts, there is a risk of lowered throughput. Also, in the case of lengthening this fixed time interval, there is a risk of a condition where the number of retransmission attempts does not change even though the state of the wireless communication system has changed greatly. In this case, there is a danger in that the wireless communication system may become unstable. Thus, it is preferable to set the time length of the fixed time interval after having ascertained the approximate periodicity of change in the state of the wireless communication system. Accordingly, the present embodiment describes setting a threshold value for the number of retransmission attempts, which is triggered by the data processor 13 receiving Pt and Ps. However, other methods are also acceptable. For example, the predicted PER calculator 15 and the retransmit count determiner 16 to be discussed later may periodically compute a threshold value for the number of retransmission attempts, irrespectively of when the data processor 13 receives Pt and Ps.

Herein, if Pt and Ps are known, then it is possible to compute a proportional time Pc during which two or more of the devices able to communicate with the base station 2 were transmitting data during a fixed period as Pc=1−Pt−Ps. Also, although Pc is taken to be computed by receiving Pt and Ps from the base station 2 in the present embodiment, it is sufficient to know any two of Pt, Pc, and Ps in order to compute all of Pt, Pc, and Ps. For example, the data processor 13 may acquire Pc by receiving a proportional time, taken to be Pc, during which the base station 2 received data packets whose data was not decoded. By then receiving a value other than Pc, such as Ps, for example, the data processor 13 is able to compute Pt according to Pt=1−Pc−Ps.

Meanwhile, in the case where the received data packet was not transmitted from the base station 2, the data processor 13 analyzes the data packet by referencing the data packet's header, for example, and identifies the transmission source of the data. Then, the data processor 13 stores identification information and transmission source information for the data packet in the storage 14. At this point, in the case where transmission source information is not identified from the received data packet, the data processor 13 stores data analysis failure information in the storage 14 instead of transmission source information.

The data processor 13 also applies modulation processing to data and audio input by the user to generate a baseband signal. The data processor 13 then outputs the generated baseband signal to the radio transceiver 11. Additionally, in the case where data packet transmission to the base station 2 fails, the data processor 13 checks with the retransmit count controller 17 to determine whether or not to retransmit the data packet. At this point, the data processor 13 is able to determine whether or not data packet transmission has failed by receiving a successful receive notification from the base station 2 via an antenna and the radio transceiver 11.

The data processor 13 retransmits the data packet that failed to be transmitted in the case of receiving retransmit instructions for the data packet from the retransmit count controller 17. In contrast, the data processor 13 does not retransmit the data packet in the case of receiving a do not retransmit data packet notification from the retransmit count controller 17.

The RSSI measurer 12 receives, from the radio transceiver 11, input of a data packet received from the base station 2. The RSSI measurer 12 measures the signal strength of the data packet and acquires the RSSI of the received signal. The RSSI measurer 12 stores data packet identification information together with the acquired RSSI and the RSSI measurement time in the storage 14. At this point, the RSSI measurer 12 may also extract information matching the identification information of the data packet from among the information stored in the storage 14 by the data processor 13, add the RSSI information and the RSSI measurement time to the extracted information, and store the result in the storage 14.

The storage 14 is a storage medium such as memory or a hard disk. The storage 14 stores a database in which data packet identification information, transmission source information, and data packet RSSIs are registered. The storage 14 also registers and stores data packet identification information and transmission source information input by the data processor 13, as well as the RSSI information and RSSI measurement time for the data packet input by the RSSI measurer 12, in the database.

As illustrated in FIG. 2, the predicted PER calculator 15 includes a standby time calculator 151 and a PER calculator 152. The standby time calculator 151 acquires Pt and Ps received from the data processor 13 by the predicted PER calculator 15. Herein, the standby time calculator 151 computes the proportional time Pc during which two or more of the devices able to communicate with the base station 2 were transmitting data during a fixed period as Pc=1−Pt−Ps. However, the standby time calculator 151 may receive any two of Pt, Pc, and Ps from the data processor 13 since it is sufficient to acquire the three Pt, Pc, and Ps as discussed earlier.

Additionally, the standby time calculator 151 acquires, from the storage 14, transmit source information including data analysis failure information, RSSI information, and an RSSI measurement time for a data packet received during the fixed period. The fixed period herein may be 10 seconds since the data processor 13 issued a data transmit request to the base station 2, for example. The standby time calculator 151 also stores an RSSI threshold value. The standby time calculator 151 then acquires the amount of time from the time when the RSSI went over the threshold value to the time when the RSSI went under the threshold value in a data packet with transmission source information. By dividing the acquired amount of time by the fixed period, the standby time calculator 151 acquires a proportional time Pt' during which an exposed node was transmitting a data packet to the base station 2 during the fixed period. The standby time calculator 151 then acquires the amount of time from the time when the RSSI went over the threshold value to the time when the RSSI went under the threshold value in a data packet with data analysis failure. By dividing the acquired amount of time by the fixed period, the standby time calculator 151 acquires a proportional time Pc' during which two or more exposed nodes were transmitting data to the base station 2 during the fixed period. Additionally, the standby time calculator 151 computes a proportional time Ps' during which no exposed nodes were transmitting data packets to the base station 2 during the fixed period as Ps'=1−Pt'−Pc'. Although Ps' is computed by subtracting Pt' and Pc' from 1 in the present embodiment herein, other methods are also acceptable. For example, the standby time calculator 151 may acquire the period during which the RSSI went under the threshold value for a data packet with data analysis failure. The standby time calculator 151 may then compute Ps' by dividing the acquired time by the fixed period.

Next, the standby time calculator 151 uses Pt, Ps, Pc, Ps', Pt', and Pc' to compute Ps". Since a hidden node exists for the device 1, it is conceivable that most packet transmit errors occur because of collisions with data packets transmitted by a device that is a hidden node. In other words, it is conceivable that the PER is the proportional time during which a hidden node is transmitting a data packet to the base station 2. Herein, Pt' is taken to be the proportional time during which a hidden node was transmitting a data packet to the base station 2 during the fixed period. Also, Ps" is taken to be the proportional time during which no hidden nodes were transmitting data packets to the base station 2 during the fixed period. Furthermore, Pc' is taken to be the proportional time during which two or more hidden nodes were transmitting data to the base station 2 during the fixed period. Given the above, the PER, i.e., the proportional time during which a hidden node was transmitting a data packet to the base station 2, may be considered to be the sum of Pt' and Pc'. In other words, the PER may be expressed as PER=Pt'+Pc"=1−Ps". Thus, since it is sufficient to know Ps" in order to compute the PER, the standby time calculator 151 outputs the computed Ps" to the PER calculator 152. The standby time calculator 151 is an example of a hidden standby time calculator.

A method of computing Ps" using Pt, Ps, Pc, Ps', Pt', and Pc' by the standby time calculator 151 will now be described.

Pc is included in Pt' and Pt'. For example, in the case where a data packet is being transmitted to the base station 2 from one exposed node (the case of Pt'), packet collisions may still occur if a data packet is being transmitted from a hidden node, and thus Pc is included. Similarly, in the case where a data packet is being transmitted to the base station 2 from one hidden node (the case of Pt'), packet collisions may still occur if a data packet is being transmitted from an exposed node, and thus Pc is included. Thus, Pc'" is taken to be Pc'"= (Pt'∩Pc)∪(Pt'∩Pc). In other words, Pc'" is the contribution of Pt' and Pt' on Pc. In this case, Pc can be expressed as in the following EQ. 1.

EQ. 1

$$Pc = Pc' + Pc'' + Pc''' \quad (1)$$

Pc becomes Pc=Pc'+Pc"+Pc'". At this point, take N1 to be the number of exposed nodes, and N2 to be the number of hidden nodes. Since the total collision time is proportional to the number of collisions, Pc' can be expressed as Pc'=k×($_{N1}C_2$), where C represents a combination. In other words, $_{N1}C_2$ is the number of combinations of exposed nodes. Similarly, Pc' is Pc"=k×($_{N2}C_2$). Also, Pc'" is Pc'"=k×N1×N2. Since Pc', Pc", and Pc'" making up Pc are proportional times, k is a suitable number satisfying Pt+Ps+Pc'+Pc'+Pc'"=1. Additionally, in the case where large numbers of exposed nodes and hidden nodes exist on a network, N1 and N2 may be considered to be significantly larger than 1, and thus Pc'" may be approximated as in the following EQ. 2.

EQ. 2

$$Pc''' = 2\frac{N2}{N1}Pc' = 2\frac{N1}{N2}Pc'' \quad (2)$$

EQS. 1 and 2 yield the following EQ. 3.

EQ. 3

$$Pc = 1 - Pt - Ps = Pc'\left(1 + \left(\frac{N2}{N1}\right)^2 + 2\frac{N2}{N1}\right) = Pc'\left(1 + \frac{N2}{N1}\right)^2 \quad (3)$$

By rearrangement, EQ. 3 may be expressed as the following EQ. 4.

EQ. 4

$$\frac{N2}{N1} = \sqrt{\frac{(1 - Pt - Ps)}{Pc'}} - 1 \quad (4)$$

Since Ps" is computed from EQ. 4, a formula expressing the relationship between Ps" and N2/N1 will now be described. Two examples of formulas expressing the relationship between Ps" and N2/N1 will be respectively described in order.

Figure 3:
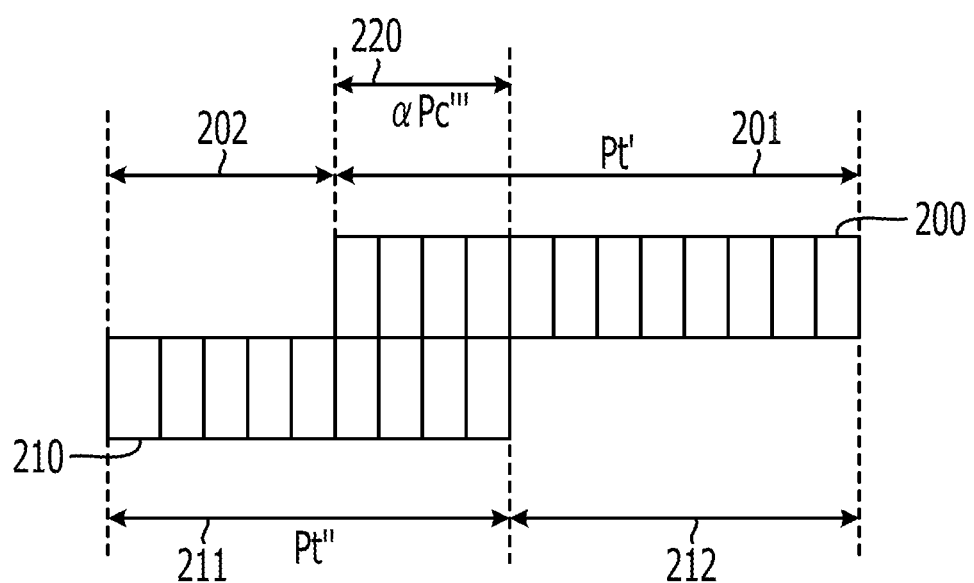
FIG. 3 is a diagram for explaining the contribution ratios of Pt' and Pt' on Pc'"

Pc''' is the portion that causes collisions other than Pc' and Pc". Thus, the part of Pt' corresponding to the case of colliding with a data packet transmitted by a hidden node overlaps with Pc'''. Also, the part of Pt" corresponding to the case of colliding with a data packet transmitted by an exposed node overlaps with Pc'''. In this way, Pc''' contains parts that overlap with Pt' and Pt". The contribution ratios of Pt' and Pt" on Pc''' will now be described with reference to FIG. 3. FIG. 3 is a diagram for explaining the contribution ratios of Pt' and Pt" on Pc'''. In FIG. 3, the horizontal axis represents time. The packet group 200 in FIG. 3 schematically represents individual packets being transmitted from an exposed node. Meanwhile, the packet group 210 represents individual packets being transmitted from a hidden node. The proportion of the time 201 occupied by the packet group 200 versus the fixed period is Pt'. The proportion of the time 211 occupied by the packet group 210 versus the fixed period is Pt". Additionally, the time 220 of the intermediate portion where the packet group 200 and the packet group 210 overlap is the time during which collisions occur, and is part of Pc'''. Consequently, the proportion of the time 220 versus the fixed period can be expressed as αPc''' (0≤α≤1). Additionally, the range of Pt' excluding αPc''' (Pt'-αPc''') expresses the proportion of the time 212 versus the fixed period during which an exposed node can communicate without a collision occurring. Also, the range of Pt" excluding αPc''' (Pt"-αPc''') expresses the proportion of the time 202 versus the fixed period during which a hidden node can communicate without a collision occurring.

Herein, if the number of communicating devices increases, the amount of time spent communicating with the base station 2 during the fixed period also increases. At this point, collision time also increases, but the amount of time during which no device is communicating decreases by an equivalent degree. Consequently, the period during which only one device is communicating during the fixed period becomes longer with more devices present.

Figure 4:
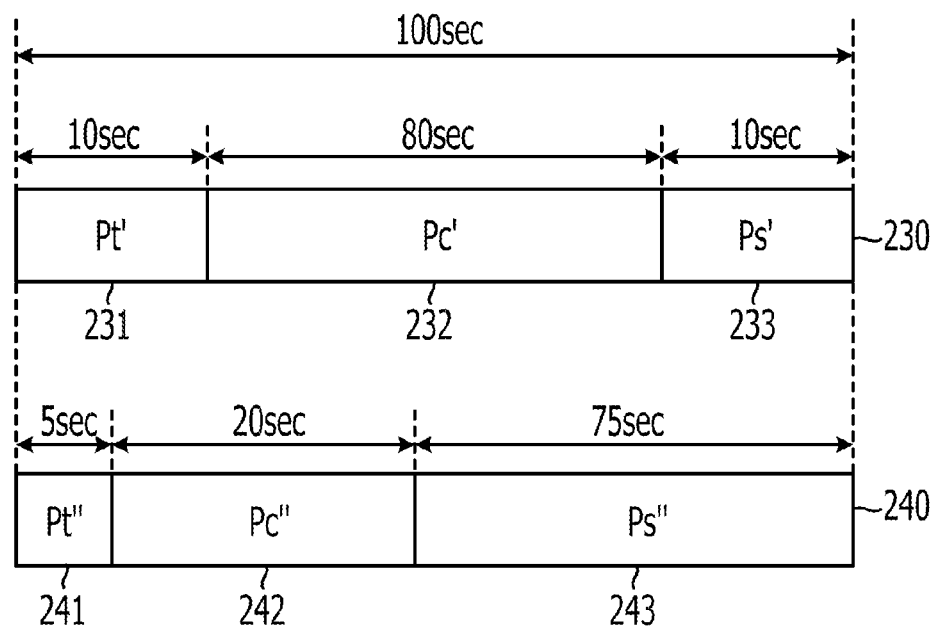
FIG. 4 is a diagram explaining the relationship between the number of devices and the time for a single device to transmit a data packet to a base station.

The relationship between the number of devices and the time for a single device to transmit a data packet to a base station will now be described in detail and with reference to FIG. 4. FIG. 4 is a diagram explaining the relationship between the number of devices and the time for a single device to transmit a data packet to a base station. In FIG. 4, a case will be described where there are ten exposed nodes, five hidden nodes, and where the fixed period is 100 s (seconds), for example. In FIG. 4, the horizontal axis represents time. The transmit state 230 expresses the transmit state of a data packet from an exposed node during the fixed period. Meanwhile, the transmit state 240 expresses the transmit state of a data packet from a hidden node during the fixed period. The time 231 is the time during which only one of the exposed nodes is transmitting a data packet to the base station 2, and expresses Pt'. Meanwhile, the time 241 is the time during which only one of the hidden nodes is transmitting a data packet to the base station 2, and expresses Pt". For example, since ten exposed nodes are communicating, the time 231 becomes 10 s. In contrast, since five hidden nodes are communicating, the time 241 becomes 5 s, shorter than the time for the exposed nodes. Also, the time 232 during which collisions occur among exposed nodes is 80 s, longer than the 20 s of the time 242 during which collisions occur among the hidden nodes. Additionally, the time 233 during which no exposed node is transmitting a data packet to the base station 2 is 10 s, shorter than the 75 s of the time 243 during which no hidden node is transmitting a data packet to the base station 2. In other words, in the transmit state 230, the time during which only one device is transmitting data to the base station 2 and the time during which collisions are occurring is longer compared to the transmit state 240, but the time during which no device is transmitting a data packet to the base station 2 is shorter by an equivalent degree. In this way, the time during which only one of the devices is transmitting data to the base station 2 increases approximately linearly with the number of devices.

As discussed above, the time during which only one of the exposed nodes is transmitting data to the base station 2 is expressed as Pt'-αPc''', while the time during which only one of the hidden nodes is transmitting data to the base station 2 is expressed as Pt"-αPc'''. Since these times are approximately proportional to their respective numbers of devices, the times can be expressed according to the following EQ. 5.

EQ. 5

$$\frac{N2}{N1}(Pt' - \alpha Pc''') = Pt'' - \alpha Pc''' \quad (5)$$

According to EQS. 2 and 5, the above can also be expressed as the following EQ. 6.

EQ. 6

$$Pt'' + Pc'' = \frac{N2}{N1}\left(Pt' - 2\frac{N2}{N1}\alpha Pc'\right) + 2\frac{N2}{N1}\alpha Pc' + \left(\frac{N2}{N1}\right)^2 Pc' \quad (6)$$

By rearrangement, EQ. 6 may be expressed as in the following EQ. 7. This EQ. 7 is one example of a formula expressing the relationship between Ps" and N2/N1.

EQ. 7

$$Ps'' = 1 - \frac{N2}{N1}\left(Pt' + Pc'\left(2\alpha + \frac{N2}{N1}(1 - 2\alpha)\right)\right) \quad (7)$$

Since α is difficult to calculate, an experimental value or a predicted value may also be used at this point. Also, a may be taken to be α=1 in cases where the number of hidden nodes or data packet traffic is not too great.

Next, another example of a formula expressing the relationship between Ps" and N2/N1 will be described. As discussed above, the time during which only one of the exposed nodes is transmitting data to the base station 2 is expressed as Pt'−αPc''', while the time during which only one of the hidden nodes is transmitting data to the base station 2 is expressed as Pt"−αPc'''. In addition, Pt is the proportion of time versus the fixed period during which a data packet is transmitted to the base station 2 from either a hidden node or an exposed node. Thus, the time during which only one of the exposed nodes is transmitting data to the base station 2 is expressed as Pt'−αPc''', the time during which only one of the hidden nodes is transmitting data to the base station 2 is expressed as Pt"−αPc''', and their sum corresponds to Pt. In other words, Pt is expressed as the following EQ. 8.

EQ. 8

$$Pt = Pt' + Pt'' - 2\alpha Pc''' \tag{8}$$

Additionally, if EQS. 2, 5, and 8 are used to solve the simultaneous equations for Pc", Pt', and Pc', and if Ps"=1−Pt"−Pc' is substituted in, the above can be expressed as the following EQ. 9. This EQ. 9 is another example of a formula expressing the relationship between Ps" and N2/N1.

EQ. 9

$$Ps'' = 1 - \left(\frac{N2}{N1}\right)^2 Pc' - Pt' - Pt \frac{N2/N1 - 1}{N2/N1 + 1} \tag{9}$$

Meanwhile, N2/N1 is computed by EQ. 4 discussed earlier. Thus, Ps" can be computed by substituting EQ. 4 into EQ. 7 or 9.

Figure 5:
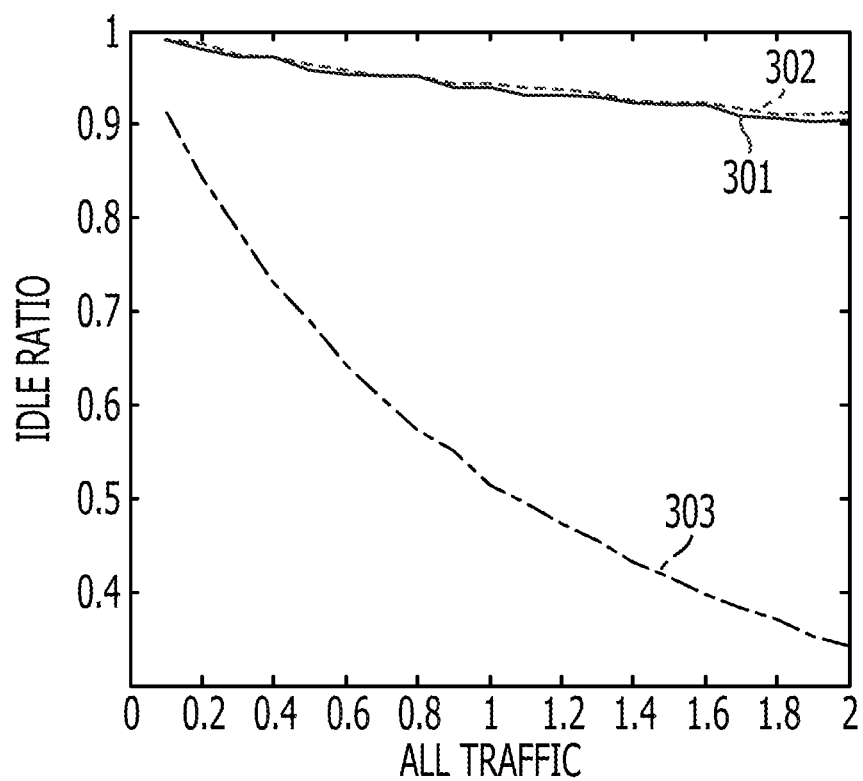
FIG. 5 is a diagram for comparing Ps" computed using EQS. 4 and 7 to simulation results.

FIG. 5 is a diagram for comparing Ps" computed using EQS. 4 and 7 to simulation results. The horizontal axis in FIG. 5 represents the time to transmit 100 data packets. Also, the vertical axis in FIG. 5 represents the proportional time during which data packets are not being transmitted.

The solid line 301 in FIG. 5 represents the proportional time Ps" during which no hidden node is transmitting a data packet, as computed using EQS. 4 and 7. The broken line 302 represents the proportional time Ps" during which no hidden node is transmitting a data packet, as computed by simulation. The chain line 303 represents the proportional time Ps' during which no exposed node is transmitting a data packet. The solid line 301 and the broken line 302 nearly overlap, demonstrating that Ps" computed using EQS. 4 and 7 nearly matches simulation results. In other words, Ps" computed using EQS. 4 and 7 is reasonably close to the proportional time during which no hidden node is transmitting a data packet, which occurs during actual communication.

Figure 6:
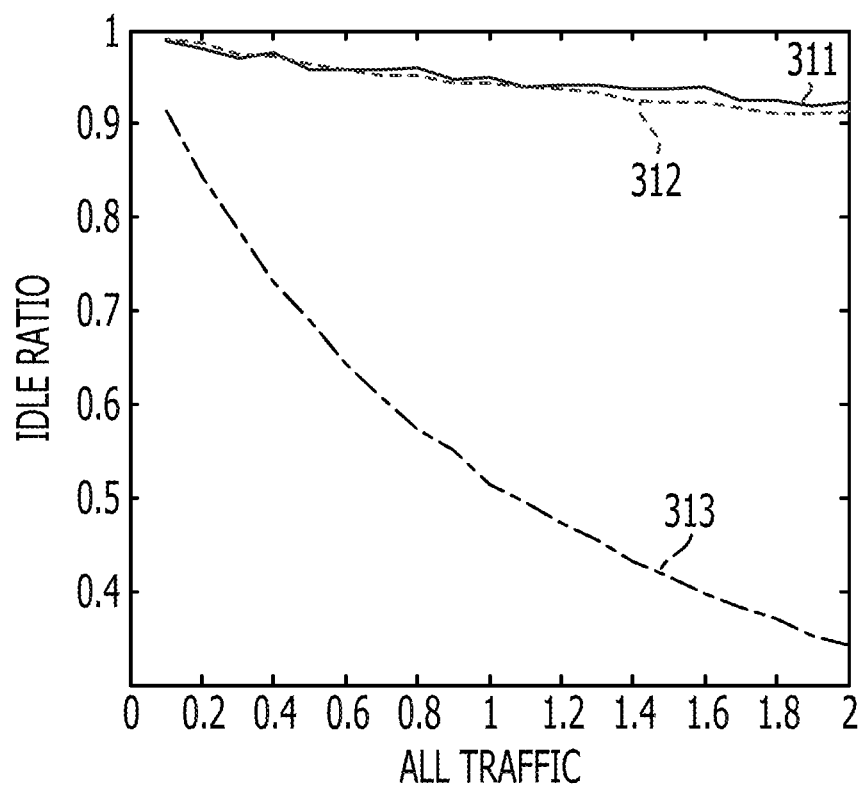
FIG. 6 is a diagram for comparing Ps" computed using EQS. 4 and 9 to simulation results.

FIG. 6 is a diagram for comparing Ps" computed using EQS. 4 and 9 to simulation results. The horizontal axis in FIG. 6 represents the time to transmit 100 data packets. Also, the vertical axis in FIG. 6 represents the proportional time during which data packets are not being transmitted.

The solid line 311 in FIG. 6 represents the proportional time Ps" during which no hidden node is transmitting a data packet, as computed using EQS. 4 and 9. The broken line 312 represents the proportional time Ps" during which no hidden node is transmitting a data packet, as computed by simulation. The chain line 313 represents the proportional time Ps' during which no exposed node is transmitting a data packet. The solid line 311 and the broken line 312 nearly overlap, demonstrating that Ps" computed using EQS. 4 and 9 nearly matches simulation results. In other words, Ps" computed using EQS. 4 and 9 is reasonably close to the proportional time during which no hidden node is transmitting a data packet, which occurs during actual communication.

In this way, Ps" computed using EQ. 4 and EQ. 7 or 9 may be considered to be sufficiently accurate.

The PER calculator 152 receives input of Ps" from the standby time calculator 151. Then, the PER calculator 152 uses Ps" to compute a predicted PER as 1−Ps". The predicted PER calculator 15 outputs the predicted PER computed by the PER calculator 152 to the retransmit count determiner 16.

The retransmit count determiner 16 receives input of a predicted PER from the predicted PER calculator 15. Then, the retransmit count determiner 16 determines the minimum n satisfying (predicted PER)^n<β as the threshold value for the number of retransmission attempts. Herein, β is a positive number significantly smaller than 1, while the caret (^) represents exponentiation. In the present embodiment, β may be taken to be 0.001, for example. Since the number of retransmission attempts increases with a smaller β and decreases with a larger β, it is preferable to set β according to the communication reliability demanded by the system. The retransmit count determiner 16 outputs the determined threshold value for the number of retransmission attempts to the retransmit count controller 17.

Note that if the fixed period used in the above description is longer, the number of data packets received in order to compute Pt, Ps, Pc, Ps', Pt', and Pc' increases. Additionally, if more data packets used for computation, a suitable value can be computed as the threshold value for the number of retransmission attempts. If the threshold value for the number of retransmission attempts is a suitable value, the communication system will be able to provide stable communication in addition to reduced power expenditure and interference on neighboring networks. However, with shorter fixed periods, the communication system computes a threshold value for the number of retransmission attempts faster and spends more time on data transmission. In such cases, there is an increased chance of improvement in communication system throughput. Thus, the fixed period is preferably set in accordance with the throughput and reliability demanded of the communication system.

The retransmit count controller 17 receives input of a threshold value for the number of retransmission attempts from the retransmit count determiner 16. The retransmit count controller 17 also includes a counter. The retransmit count controller 17 resets the counter in the case where a data packet is transmitted to the base station 2. Additionally, in the case where data packet transmission to the base station 2 fails, the retransmit count controller 17 receives, from the data processor 13, a check to determine whether or not to retransmit the data packet. The retransmit count controller 17 compares the counter to a stored threshold value, and determines whether or not the counter value exceeds the threshold value. In the case where the threshold value has not been exceeded, the retransmit count controller 17 outputs a data packet retransmit notification to the data processor 13. The retransmit count controller 17 then increments its counter by 1. In contrast, in the case where the counter value exceeds the threshold value, the retransmit count controller 17 outputs a data packet transmit failure to the host processor 18. The retransmit count controller 17 then receives from the host processor 18 an execution command for a process such as notifying the user or notifying the base station 2. The retransmit count controller 17 outputs the execution command received from the host processor 18 to the data processor 13.

The host processor 18 determines a process to execute when there is a data packet transmit failure. The host processor 18 receives input of a data packet transmit failure notification from the retransmit count controller 17. Upon receiving a data packet transmit failure notification, the host processor 18 executes an application process or other such process in the case where the host processor 18 itself conducts the processing. For example, the host processor 18 may create an error message. The host processor 18 then outputs to the retransmit count controller 17 an execution command for a process such as notifying the user or notifying the base station 2. Although the host processor 18 conducts a process such as notifying the user or notifying the base station 2 in the present embodiment, an embodiment is not limited thereto, and other processes may be conducted insofar as they are processes conducted in response to a data packet transmit failure.

Figure 7:
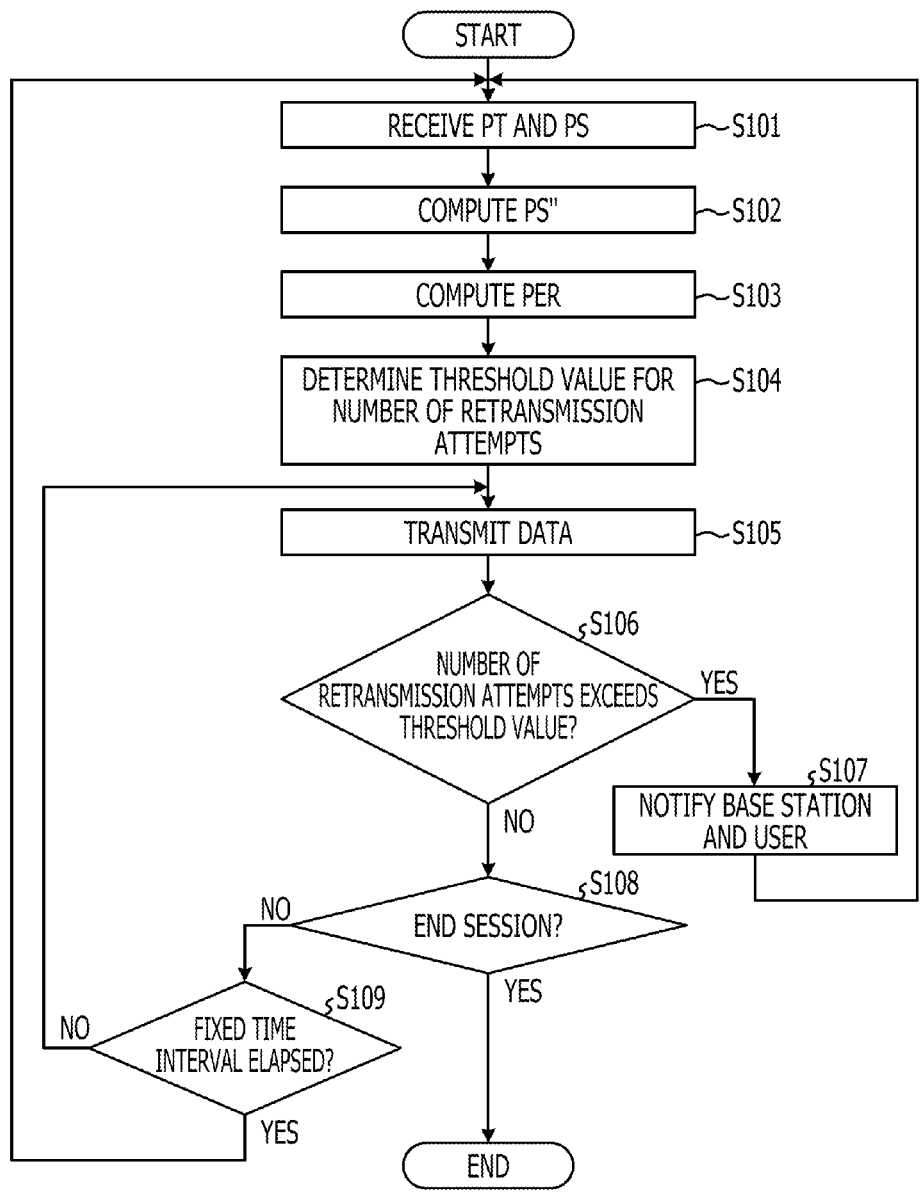
FIG. 7 is a flowchart of a process for communicating with a base station by a device in accordance with Embodiment 1.

Next, communication with the base station 2 by the device 1 in accordance with the present embodiment will be described with reference to FIG. 7. FIG. 7 is a flowchart of a process for communicating with a base station by a device in accordance with Embodiment 1.

The data processor 13 transmits a data transmit request to the base station 2. The data processor 13 then receives Pt and Ps from the base station 2 (S101). Additionally, the data processor 13 computes Pc, Ps', Pt', and Pc' on the basis of data packets received from exposed nodes.

The predicted PER calculator 15 receives input of Pt, Ps, Pc, Ps', Pt', and Pc' from the data processor 13. The predicted PER calculator 15 then calculates Ps" using Pt, Ps, Pc, Ps', and Pc' in EQ. 4 as well as EQ. 7 or 9 (S102).

The predicted PER calculator 15 also uses the computed Ps" to calculate a predicted PER (1−Ps") (S103).

The retransmit count determiner 16 receives input of a predicted PER from the predicted PER calculator 15. The retransmit count determiner 16 then computes the minimum number n satisfying (predicted PER)^n<β. The retransmit count determiner 16 determines the computed n to be the threshold value for the number of retransmission attempts (S104). The retransmit count determiner 16 outputs the threshold value for the number of retransmission attempts to the retransmit count controller 17.

The data processor 13 transmits data input by the user to the base station 2 via the radio transceiver 11 and an antenna (S105).

The retransmit count controller 17 determines whether or not the number of data packet retransmit attempts for a data packet by the data processor 13 exceeds the threshold value (S106). In the case where the number of data packet retransmit attempts has been exceeded (S106, Yes), the host processor 18 issues notifications to the user and to the base station 2 as a process conducted in the event of a data packet transmit failure (S107). The device 1 then returns the process to S101.

In contrast, in the case where the number of data packet retransmit attempts does not exceed the threshold value (S106, No), the data processor 13 determines whether or not to end communication (S108). In the case of ending communication (S108, Yes), the data processor 13 ends communication with the base station 2.

In contrast, in the case of not ending communication (S108, No), the data processor 13 determines whether or not a fixed time interval has elapsed (S109).

The data processor 13 then returns to S105 in the case of determining that the fixed time interval has not elapsed (S109, No). In contrast, the data processor 13 returns to S101 in the case of determining that the fixed time interval has elapsed (S109, Yes).

As described above, a wireless communication device in accordance with the present embodiment computes a proportional state during which a hidden node is transmitting a data packet to a base station from the transmit states of hidden nodes and exposed nodes, and uses that value to compute a predicted PER. In so doing, a predicted PER can be computed accurately, and the number of retransmission attempts can be set to a suitable value. Consequently, the reliability of a wireless communication system can be improved, and in addition, power expenditure and influence on neighboring networks can be reduced.

Embodiment 2

Next, a device in accordance with Embodiment 2 will be described. In a device in accordance with the present embodiment, the method of computing Ps" differs from that of Embodiment 1. Thus, computation of Ps" will be primarily described hereinafter. A device 1 in accordance with the present embodiment is likewise illustrated by the block diagram in FIG. 2. In the present embodiment, components having reference symbols like those of Embodiment 1 are taken to have like functions, unless specifically described otherwise hereinafter.

From the base station 2 the data processor 13 receives Pt and the amount of transmitted data received by the base station 2. Additionally, the data processor 13 uses information on devices sensed by carrier sense to acquire, from the base station 2, the amount of data transmitted by exposed nodes and received by the base station 2. By subtracting the amount of data transmitted by exposed nodes and received by the base station 2 from the amount of transmitted data received by the base station 2, the data processor 13 acquires the amount of data transmitted by hidden nodes and received by the base station 2.

From the data processor 13 the predicted PER calculator 15 acquires Pt, the amount of data transmitted by exposed nodes and received by the base station 2, and the amount of data transmitted by hidden nodes and received by the base station 2.

Herein, the proportions of Pt' and Pt" in Pt correspond to the amount of data transmitted by exposed nodes and received by the base station 2, and to the amount of data transmitted by hidden nodes and received by the base station 2.

Thus, the predicted PER calculator 15 computes Pt' and Pt" by splitting Pt according to the proportional amount of data transmitted by exposed nodes and received by the base station 2 versus the amount of data transmitted by hidden nodes and received by the base station 2.

At this point, N2/N1 can be approximated as N2/N1≅Pt"/Pt'. Thus, the predicted PER calculator 15 takes the computed value for Pt"/Pt' to be N2/N1. The predicted PER calculator 15 is then able to compute Ps" by substituting the computed N2/N1 into EQ. 7 or EQ. 9.

Figure 8:
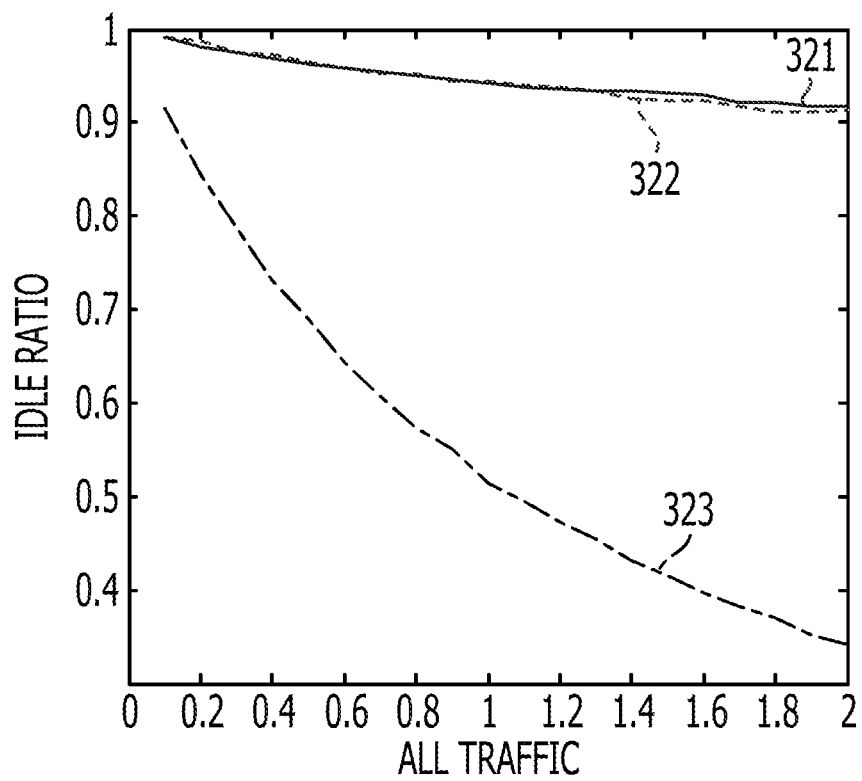
FIG. 8 is a diagram for comparing Ps" computed using EQ. 9 in Embodiment 2 to simulation results.

FIG. 8 is a diagram for comparing Ps" computed using EQ. 9 in Embodiment 2 to simulation results. The horizontal axis in FIG. 8 represents the time to transmit 100 data packets. Also, the vertical axis in FIG. 8 represents the proportional time during which data packets are not being transmitted.

The solid line 321 in FIG. 8 represents the proportional time Ps" during which no hidden node is transmitting a data packet, as computed using EQ. 9. The broken line 322 represents the proportional time Ps" during which no hidden node is transmitting a data packet, as computed by simulation. The chain line 323 represents the proportional time Ps' during which no exposed node is transmitting a data packet. The solid line 321 and the broken line 322 nearly overlap, demonstrating that Ps" computed using EQ. 9 in the present embodiment nearly matches simulation results. In other words, the above demonstrates that Ps" computed using EQ. 9 in the present embodiment is close to the proportional time during which no hidden node is transmitting a data packet, which occurs during actual communication.

As discussed earlier, a wireless communication device in accordance with the present embodiment is able to compute N2/N1 without performing complicated calculations. In so doing, the processing load can be reduced, and furthermore, a threshold value for the number of retransmission attempts can be rapidly computed compared to Embodiment 1.

Although the device 1 receives the amount of data transmitted by exposed nodes and received by the base station 2 from the base station 2 in the present embodiment herein, other methods are also acceptable. For example, the device 1 may also receive the amount of data transmitted by exposed nodes and received by the base station 2 from an exposed node.

Embodiment 3

Next, a device in accordance with Embodiment 3 will be described. In a device in accordance with the present embodiment, the method of computing Ps" differs from that of Embodiment 1. Thus, computation of Ps" will be primarily described hereinafter. A device 1 in accordance with the present embodiment is likewise illustrated by the block diagram in FIG. 2. In the present embodiment, components having reference symbols like those of Embodiment 1 are taken to have like functions, unless specifically described otherwise hereinafter.

The data processor 13 acquires acknowledgment packets that are transmitted to the source of a data packet when the base station 2 has received a data packet. The data processor 13 analyzes the acknowledgment packets and identifies acknowledgment packets heading to exposed nodes. The data processor 13 identifies the remainder as acknowledgment packets heading to hidden nodes. The data processor 13 then computes Pt"/Pt' by taking the ratio of the number of acknowledgment packets heading to exposed nodes and the number of acknowledgment packets heading to hidden nodes to be an approximation of the ratio of Pt' and Pt".

The predicted PER calculator 15 takes the computed value for Pt"/Pt' to be N2/N1. The predicted PER calculator 15 is then able to compute Ps" by substituting the computed N2/N1 into EQ. 7 or EQ. 9.

Embodiment 4

Next, a device in accordance with Embodiment 4 will be described. In a device in accordance with the present embodiment, the method of computing Ps" differs from that of Embodiment 1. Thus, computation of Ps" will be primarily described hereinafter. A device 1 in accordance with the present embodiment is likewise illustrated by the block diagram in FIG. 2. In the present embodiment, components having reference symbols like those of Embodiment 1 are taken to have like functions, unless specifically described otherwise hereinafter.

From the base station 2 the data processor 13 receives the total number of all devices able to communicate with the base station 2. At this point, the data processor 13 may also acquire a list of the MAC addresses of all devices able to communicate with the base station 2 and compute the total number of all devices able to communicate with the base station 2 from this list. In addition, the data processor 13 acquires the number of exposed nodes from data packets sensed by carrier sense. The data processor 13 then computes the number of hidden nodes by subtracting the number of exposed nodes from the total number of devices able to communicate with the base station 2. The data processor 13 then computes Pt"/Pt' by taking the ratio of the number of exposed nodes and the number of hidden nodes to be an approximation of the ratio of Pt' and Pt".

The predicted PER calculator 15 takes the computed value for Pt"/Pt' to be N2/N1. The predicted PER calculator 15 is then able to compute Ps" by substituting the computed N2/N1 into EQ. 7 or EQ. 9.

As discussed earlier, a wireless communication device in accordance with the present embodiment is able to compute N2/N1 without performing complicated calculations. In so doing, the processing load can be reduced, and furthermore, a threshold value for the number of retransmission attempts can be rapidly computed compared to Embodiment 1.

Embodiment 5

Next, a device in accordance with Embodiment 5 will be described. In a device in accordance with the present embodiment, the method of computing Ps" differs from that of Embodiment 1. Thus, computation of Ps" will be primarily described hereinafter. A device 1 in accordance with the present embodiment is likewise illustrated by the block diagram in FIG. 2. In the present embodiment, components having reference symbols like those of Embodiment 1 are taken to have like functions, unless specifically described otherwise hereinafter.

From the RSSI measurer 12 the data processor 13 acquires the RSSI of a signal transmitted from the base station 2. The data processor 13 uses the acquired RSSI to compute the distance between the device 1 and the base station 2. The data processor 13 then transmits the distance between the device 1 and the base station 2 to the predicted PER calculator 15.

The predicted PER calculator 15 receives the distance between the device 1 and the base station 2 from the data processor 13. However, acquisition of the distance between the device 1 and the base station 2 by the predicted PER calculator 15 is not limited to the above. For example, the predicted PER calculator 15 may also store a measured value for the distance between the device 1 and the base station 2 in advance. The predicted PER calculator 15 also stores the distance reached by radio waves in one hop from the device 1, and the distance reached by radio waves in one hop from the base station 2.

The predicted PER calculator 15 also computes the area of the range enclosed by the distance reached by radio waves in one hop from the base station 2. This corresponds to the area of the area 4 in FIG. 1, for example. Additionally, the predicted PER calculator 15 computes the area of the range which is enclosed by the distance reached by radio waves in one hop from the base station 2 and which is also enclosed by the distance reached by radio waves in one hop from the device 1 (hereinafter designated the "exposed area"). This corresponds to the area of the portion where area 3 and area 4 overlap in FIG. 1, for example. Additionally, the predicted PER calculator 15 computes the area of the range which is enclosed by the distance reached by radio waves in one hop from the base station 2 but which is not reached by radio waves in one hop from the device 1 (hereinafter designated the "hidden area"). This corresponds to the area of the portion where area 3 and area 4 do not overlap in FIG. 1, for example. The predicted PER calculator 15 then computes Pt"/Pt' by taking other devices to be evenly distributed and by taking the ratio of the exposed area and the hidden area to be an approximation of the ratio of Pt' and Pt". In this case, the number of hidden nodes inside the exposed area (such as the device 42 in FIG. 1, for example) is not considered. In practice, however, most hidden nodes exist in the hidden area and exert most of the influence on a device. Thus, an approximate value can be computed even if hidden nodes existing inside the exposed area are ignored.

The predicted PER calculator 15 takes the computed value for Pt"/Pt' to be N2/N1. The predicted PER calculator 15 is then able to compute Ps" by substituting the computed N2/N1 into EQ. 7 or EQ. 9.

As discussed earlier, a wireless communication device in accordance with the present embodiment is able to compute N2/N1 without performing complicated calculations. In so doing, the processing load can be reduced, and furthermore, a threshold value for the number of retransmission attempts can be rapidly computed compared to Embodiment 1.

As discussed earlier, a wireless communication device in accordance with the present embodiment is able to compute N2/N1 without performing complicated calculations. In so doing, the processing load can be reduced, and furthermore, a threshold value for the number of retransmission attempts can be rapidly computed compared to Embodiment 1.

Figure 9:
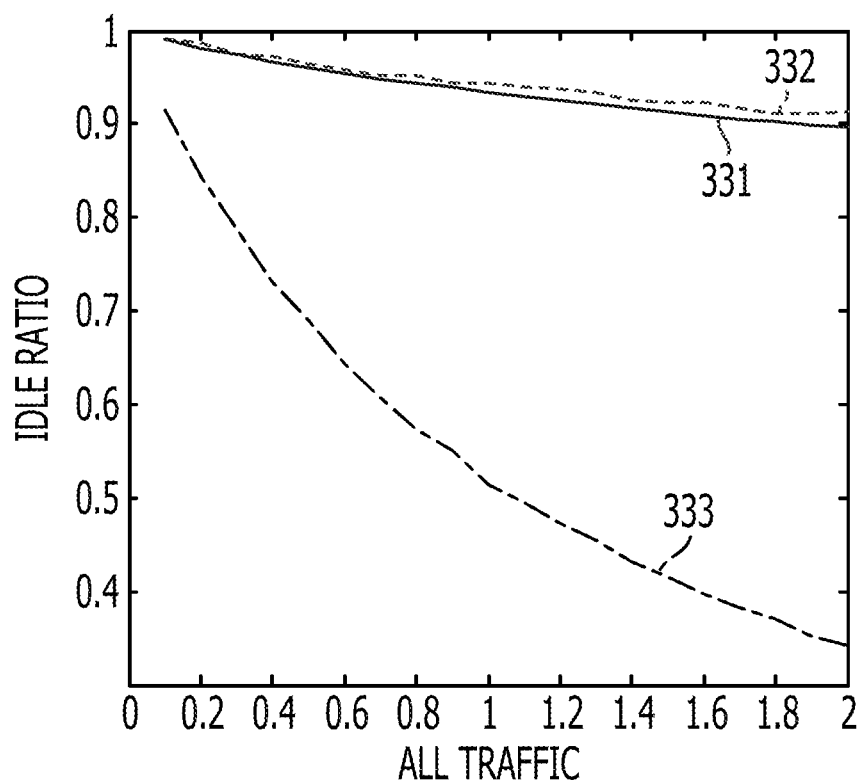
FIG. 9 is a diagram for comparing Ps" computed using EQ. 7 in Embodiments 3 to 5 to simulation results.

FIG. 9 is a diagram for comparing Ps" computed using EQ. 7 in Embodiments 3 to 5 to simulation results. The horizontal axis in FIG. 9 represents the time to transmit 100 data packets. Also, the vertical axis in FIG. 9 represents the proportional time during which data packets are not being transmitted.

The solid line 331 in FIG. 9 represents the proportional time Ps" during which no hidden node is transmitting a data packet, as computed using EQ. 7. Since the computed Ps" is nearly the same value in Embodiments 3 to 5 herein, the Ps" values computed in Embodiments 3 to 5 are collectively represented by the solid line 331. The broken line 332 represents the proportional time Ps" during which no hidden node is transmitting a data packet, as computed by simulation. The chain line 333 represents the proportional time Ps' during which no exposed node is transmitting a data packet. The solid line 331 and the broken line 332 nearly overlap, demonstrating that Ps" computed using EQ. 7 in Embodiments 3 to 5 nearly match simulation results. In other words, the above demonstrates that Ps" computed using EQ. 7 in Embodiments 3 to 5 is close to the proportional time during which no hidden node is transmitting a data packet, which occurs during actual communication.

Hardware Configuration

Figure 10:
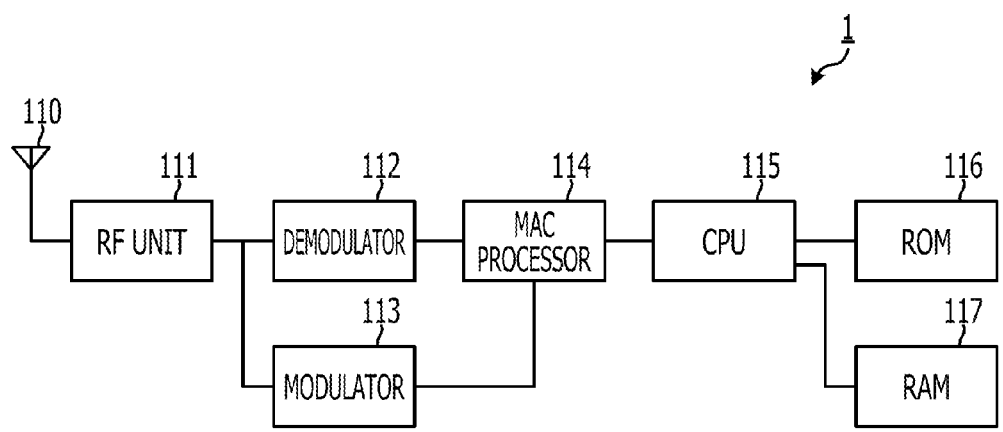
FIG. 10 is a hardware configuration diagram of a device.

Next, a hardware configuration of a device 1 will be described. FIG. 10 is a hardware configuration diagram of a device. As illustrated in FIG. 10, a device 1 in accordance the embodiments includes an antenna 110, an RF unit 111, a demodulator 112, a modulator 113, a MAC processor 114, a CPU 115, ROM 116, and RAM 117.

The RF unit 111 corresponds to the radio transceiver 11 illustrated in FIG. 2, for example. The demodulator 112, the modulator 113, and the MAC processor 114 correspond to partial functions of the data processor 13 illustrated in FIG. 3, for example.

The CPU 115 and the ROM 116 realize the functions of the data processor 13, the RSSI measurer 12, the predicted PER calculator 15, the retransmit count determiner 16, the retransmit count controller 17, and the host processor 18 illustrated in FIG. 2, for example. For example, the ROM 116 may store various programs that realize processing in accordance with the data processor 13, the RSSI measurer 12, the predicted PER calculator 15, the retransmit count determiner 16, the retransmit count controller 17, and the host processor 18 illustrated by example in FIG. 2. The CPU 115 may generate processes that realize the above functions by reading out and executing these various programs. The ROM 116 also stores algorithms or other processes conducted in an application layer or other host layer. Such host layer processes may include displaying information on a display, stopping operation, or transmitting emergency data to the base station 2, for example. The RAM 117 corresponds to the storage 14 illustrated in FIG. 2.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A wireless communication device in a wireless communication system including nodes and a base station, the nodes including the wireless communication device and other nodes, the wireless communication device comprising:
   a radio transceiver configured to transmit a radio transmission signal to the base station, and to receive a radio reception signal transmitted from the other nodes to the base station; and
   a processor configured to perform packet analysis for specifying exposed nodes based on reception packets included in the radio reception signal, the exposed nodes being the other nodes that the packet analysis specifies successfully,
   generate at least two of first information relating to a length of a first period, second information relating to a length of a second period, and third information relating to a length of a third period, the first period during which just one of the exposed nodes transmits, the second period during which at least two of the exposed nodes transmit, the third period during which none of the exposed nodes transmits,
   generate fourth information relating to a length of a fourth period based on at least two of the first information, the second information, and the third information, the fourth period during which none of hidden nodes transmits, the hidden nodes being the other nodes that the packet analysis fails to specify, and
   generate a packet error rate of transmission packets transmitted in the radio transmission signal, based on the fourth information.

2. The wireless communication device according to claim 1, wherein the processor is further configured to receive at least two of fifth information relating to a length of a fifth period, sixth information relating to a length of a sixth period, and seventh information relating to a length of a seventh period, from the base station, the fifth period during which just one of the nodes transmits, the sixth period during which at least two of the nodes transmit, the seventh period during which none of the nodes transmits, and
   generate the fourth information further based on at least two of the fifth information, the sixth information, and the seventh information.

3. The wireless communication device according to claim 2, wherein the processor computes a ratio of a total number of hidden nodes and a total number of exposed nodes on the basis of the second information and any two of the fifth information, the sixth information, and the seventh information, and computes the fourth information on the basis of the computed ratio of the total number of hidden nodes and the total number of exposed nodes, the first information, and the second information.

4. The wireless communication device according to claim 1, wherein the processor computes a ratio of eighth information relating to a length of an eighth period and the first information as a ratio of a total number of hidden nodes and a total number of exposed nodes, the eighth period during which just one of the hidden nodes transmits, and computes the fourth information on the basis of the computed ratio of the total number of hidden nodes and the total number of exposed nodes, the first information, the second information, and the fifth information.

5. The wireless communication device according to claim 4, wherein the radio transceiver is further configured to acquire a total amount of data received by the base station and an amount of data transmitted by the exposed nodes, and the processor computes an amount of data transmitted by the hidden nodes by subtracting the amount of data transmitted by the exposed nodes from the total amount of data received by the base station, which were received by the radio transceiver and computes a ratio of the amount of data transmitted by the hidden nodes and the amount of data transmitted by the exposed nodes as a ratio of the eighth information and the first information.

6. The wireless communication device according to claim 4, wherein the radio transceiver receives, from the base station, acknowledgment packets that are transmitted by the base station upon receiving a data packet, and the processor computes a number of acknowledgment packets heading to the hidden nodes and a number of acknowledgment packets heading to the exposed nodes on the basis of the acknowledgment packets received by the radio transceiver, and computes a ratio of the number of acknowledgment packets heading to the hidden nodes and the number of acknowledgment packets heading to the exposed nodes as a ratio of the eighth information and the first information.

7. The wireless communication device according to claim 4, wherein the radio transceiver is further configured to acquire a total number of other wireless communication devices able to communicate with the base station, and the processor is further configured to compute the total number of exposed nodes on the basis of data packets received from the exposed nodes, and the processor computes the total number of hidden nodes on the basis of the total number of other wireless communication devices and the total number of exposed nodes, and computes a ratio of the total number of hidden nodes and the total number of exposed nodes as a ratio of the eighth information and the first information.

8. The wireless communication device according to claim 1, wherein the processor is further configured to measure receive signal strength indications (RSSIs) of data packets received by the radio transceiver, and the processor computes the first information, the second information, and the third information on the basis of the RSSIs of data packets received from the exposed nodes.

9. The wireless communication device according to claim 4, wherein the processor computes a first area and a second area on the basis of a distance reached by data packets in one hop from the wireless communication device, a distance reached by data packets in one hop from the base station, and a distance between the wireless communication device and the base station, the first area being an area of a range which is enclosed by the distance reached by data packets in one hop from the base station and which is also enclosed by the distance reached by data packets in one hop from the wireless communication device, and the second area being an area of a range which is enclosed by the distance reached by data packets in one hop from the base station but which is not reached by data packets in one hop from the wireless communication device, and computes a ratio of the second area and the first area as a ratio of the eighth information and the first information.

10. A method of controlling a wireless communication device in a wireless communication system including nodes and a base station, the nodes including the wireless communication device and other nodes, the method comprising:
  transmitting a radio transmission signal to the base station;
  receiving a radio reception signal transmitted from the other nodes to the base station;
  performing packet analysis for specifying exposed nodes based on reception packets included in the radio reception signal, the exposed nodes being the other nodes that the packet analysis specifies successfully;
  generating at least two of first information relating to a length of a first period, second information relating to a length of a second period, and third information relating to a length of a third period, the first period during which just one of the exposed nodes transmits, the second period during which at least two of the exposed nodes transmit, the third period during which none of the exposed nodes transmits;
  generating fourth information relating to a length of a fourth period based on at least two of the first information, the second information, and the third information, the fourth period during which none of hidden nodes transmits, the hidden nodes being the other nodes that the packet analysis fails to specify; and
  generating a packet error rate of transmission packets transmitted in the radio transmission signal, based on the fourth information.

11. The wireless communication device according to claim 1, wherein the processor is further configured to set the maximum number of retransmission based on the packet error rate.

* * * * *